US010102103B2

(12) United States Patent
McNutt (10) Patent No.: US 10,102,103 B2
(45) Date of Patent: Oct. 16, 2018

(54) SYSTEM RESOURCE COMPONENT UTILIZATION

(71) Applicant: International Business Machines Corporation, Armonk, NY (US)

(72) Inventor: Bruce McNutt, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 14/937,999

(22) Filed: Nov. 11, 2015

(65) Prior Publication Data

US 2017/0132058 A1   May 11, 2017

(51) Int. Cl.
*G06F 9/46* (2006.01)
*G06F 11/34* (2006.01)
*G06F 11/07* (2006.01)

(52) U.S. Cl.
CPC ...... *G06F 11/3495* (2013.01); *G06F 11/0706* (2013.01); *G06F 11/0754* (2013.01)

(58) Field of Classification Search
None
See application file for complete search history.

(56) References Cited

U.S. PATENT DOCUMENTS

| 7,475,399 | B2 | 1/2009 | Arimilli et al. |
| 8,341,637 | B2 | 12/2012 | Corry et al. |
| 8,560,667 | B2 | 10/2013 | Kikuchi et al. |
| 8,667,120 | B2 | 3/2014 | Kurebayashi et al. |
| 2001/0054020 | A1 | 12/2001 | Barth et al. |
| 2002/0021686 | A1 | 2/2002 | Ozluturk et al. |
| 2004/0236757 | A1* | 11/2004 | Caccavale ........... G06F 11/3409 |

(Continued)

FOREIGN PATENT DOCUMENTS

| CN | 101198141 A | 6/2008 |
| JP | 2000090093 A | 3/2000 |
| JP | 2012190092 A | 10/2012 |

OTHER PUBLICATIONS

Fontoura et al., "Inverted Index Support for Numeric Search", Sep. 12, 2005, pp. 1-22.

(Continued)

*Primary Examiner* — Kenneth Tang
(74) *Attorney, Agent, or Firm* — Zilka-Kotab, P.C.

(57) ABSTRACT

A computer implemented method including receiving a set of utilization metrics for a system comprising at least an average number of concurrent requests to the system and a maximum concurrency that the system is capable of supporting, providing a function that incorporates two curve segments, computing a utilization according to a ratio of the average concurrent requests to the function, and managing performance problems indicated by the utilization. A computer implemented method including receiving a set of response time metrics comprising at least an average response time, average concurrent requests, and a minimum interference response time, computing a current response ratio of the minimum interference response time and the average response time, computing a maximum response ratio corresponding to a maximum concurrency, determining the maximum concurrency is inaccurate by comparing the maximum response ratio and the current response ratio, and replacing the maximum concurrency.

9 Claims, 5 Drawing Sheets

(56) References Cited

U.S. PATENT DOCUMENTS

| | | |
|---|---|---|
| 2005/0018611 A1 | 1/2005 | Chan et al. |
| 2011/0022806 A1 | 1/2011 | Wang et al. |
| 2011/0296463 A1 | 12/2011 | Suslov |
| 2012/0023117 A1 | 1/2012 | Butt et al. |
| 2013/0318283 A1 | 11/2013 | Small et al. |
| 2014/0025823 A1 | 1/2014 | Szabo et al. |
| 2014/0201360 A1 | 7/2014 | Marshall |
| 2016/0036677 A1* | 2/2016 | McNutt ............... H04L 43/0876 709/224 |

OTHER PUBLICATIONS

Internet Society et al., "With-defaults Capability for NETCONF (RFC6243)", An IP.com Prior Art Database Technical Disclosure, Original Publication Date: Jun. 1, 2011, IP.com No. IPCOM000208317D, IP.com Electronic Publication: Jul. 1, 2011, pp. 1-53.

McNutt, Bruce, "Waiting for a Black Box", CMG Proceedings, Nov. 2013, pp. 1-9.

Mehl et al., "Combining Different Worlds—A Scalable Multi-Coupling Approach", Sep. 12, 2014, pp. 1-75.

Sabatini et al., "Numerical Search of Bounded Relative Satellite Motion", Nonlinear Dynamics and Systems Theory, 6 (4) (2006) pp. 411-419, Received: Jul. 19, 2005, Revised: Oct. 10, 2006, © 2006 Informath Publishing Group/1562-8353.

"Monitoring Device Usage", U.S. Appl. No. 14/447,879, filed Jul. 31, 2014, pp. 1-45.

"Monitoring Device Usage", U.S. Appl. No. 14/447,997, filed Jul. 31, 2014, pp. 1-46.

\* cited by examiner

SYSTEM RESOURCE COMPONENT UTILIZATION

BACKGROUND OF THE INVENTION

The present invention relates generally to the field of system resource utilization, and more specifically to computing a set of utilization metrics.

With respect to computer systems, utilization refers to a system's usage of processing resources, or the amount of available resources being utilized to execute a current workload. Actual utilization varies depending on the amount and type of managed computing tasks. Certain tasks may require intense system utilization, while others may require significantly less, such as may be the case when part of a task is allocated to resources outside of the system. In some cases, utilization may be used to gauge a system's performance. For example, a heavy utilization with only a few running programs may indicate insufficient power support to a system, or running programs hidden by a system monitor. The latter may be a high indicator of viruses or malware present on the system. For these reasons, a utilization is a useful metric for analyzing system performance.

SUMMARY

As disclosed herein, a computer implemented method for computing a system utilization includes receiving a set of utilization metrics for a system comprising at least an average number of concurrent requests to the system N and a maximum concurrency c that the system is capable of supporting, providing a function $FixP_D(N)$ that incorporates two curve segments that form a smooth joint at a point at which they intersect, computing a utilization U according to a ratio of the average concurrent requests N to the function $FixP_D(N)$, and managing performance problems indicated by the utilization. A computer program product corresponding to the method is also disclosed.

Also disclosed herein, a computer implemented method for adjusting a system's maximum concurrency include receiving a set of response time metrics comprising at least an average response time R, average concurrent requests N, and a minimum interference response time s, computing a current response ratio M of minimum interference response time s and average response time R, computing a maximum response ratio K(c) corresponding to a maximum concurrency c, determining maximum concurrency c is inaccurate by comparing maximum response ratio K(c) and current response ratio M, and responsive to determining maximum concurrency c is inaccurate, replacing maximum concurrency c with average concurrent requests N.

DETAILED DESCRIPTION

With respect to the utilization of a system, the average number of requests to a system N can be computed according to the equation:

$$N = c*U/(1-U^c) \quad (1)$$

With respect to equation (1), the variable c indicates a maximum concurrency of the system, and the variable U indicates the utilization of the system. A maximum concurrency is a maximum number of requests that a system is capable of handling at the same time without needing to queue any of the work. The utilization of a system refers to the fraction of available resources being utilized. In some cases, the average number of requests to a system may be easier to monitor than the utilization of the system. In such cases, it may be beneficial to be able to compute the utilization with respect to the average number of requests and the maximum concurrency. Rearranging equation 1 yields:

$$U = N/(N+c*(1-U)/(1-U^c)) \quad (2)$$

Equation (2) describes the utilization U in terms of itself, therefore the solution is a value of U that is invariant with respect to the operation shown on the right hand side. Equations such as this are described as fixed-point equations. The fixed-point operation that appears on the right-hand side of equation (2) has the desirable property that any guess as to the value of U can be improved by applying it. However, the improvement may not occur rapidly enough for this approach to be useful for computing a utilization. Also of note, the denominator of equation 2 lies within a certain range that is dependent on N, making it possible to model the denominator based on N. For these reasons, computing the utilization can be simplified by replacing the denominator of equation 2 with an empirical approximation based on N, hereinafter referred to as $FixP_D(N)$ A system and method for computing a utilization using such an empirical approximation is described herein with respect to the following figures.

Figure 1:
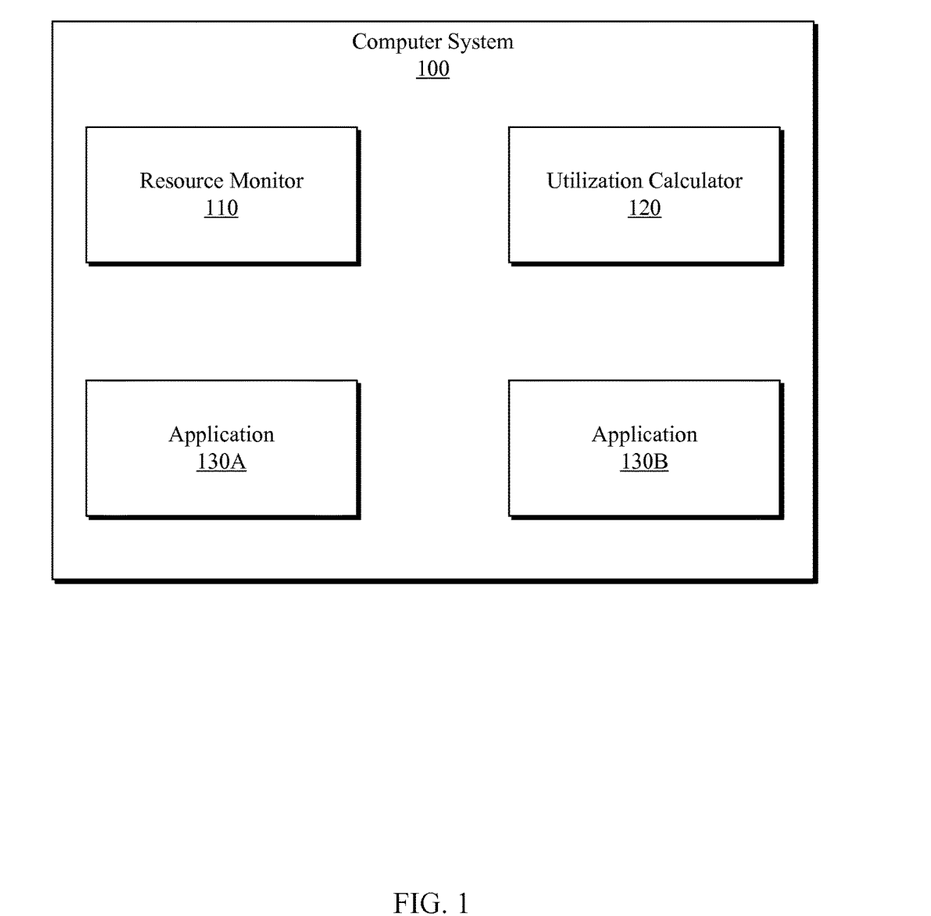
FIG. 1 is a block diagram depicting one embodiment of a utilization monitoring system in accordance with some embodiments of the present invention.

FIG. 1 is a block diagram depicting components of a utilization monitoring system 100 in accordance with some embodiments of the present invention. As depicted, utilization monitoring system 100 includes resource monitor 110, utilization calculator 120, and applications 130A and 130B. Utilization monitoring system 100 is an example of an environment in which utilization calculation may be utilized.

Resource monitor 110 may be configured to monitor metrics associated with a computer system's utilization. In some embodiments, resource monitor 110 is configured to monitor the utilization of multiple applications within utilization monitoring system 100 to provide an aggregated utilization metric. Resource monitor 110 may be configured to monitor the utilization of utilization monitoring system 100 in its entirety. In other embodiments, resource monitor 110 is configured to monitor the utilization of an application of interest, such as application 130A or 130B, within utilization monitoring system 100. The utilization metrics monitored by resource monitor 110 may include a maximum concurrency c that utilization monitoring system 100 is capable of supporting. In some embodiments, resource monitor 110 is configured to execute a concurrency calculation method such as concurrency calculation method 300 discussed with respect to FIG. 3. In some embodiments, the utilization metrics monitored by resource monitor 110 also includes an observed average number of concurrent requests N on the system. Utilization metrics 115 may be provided to utilization calculator 120.

Utilization calculator 120 may be configured to receiver utilization metrics 115 from resource monitor 110. In some embodiments, utilization calculator 120 is configured to execute a utilization calculation method, such as utilization calculation method 200 described with respect to FIG. 2, to provide a utilization corresponding to computer system 100. Additionally, utilization calculator 120 may be configured to compute a tipping point corresponding to the average number of concurrent requests N on the system. Utilization calculator 120 may be configured to provide the utilization to a user or to another application.

Applications 130A and 130B may be representative of any applications also existing within utilization monitoring system 100. The depicted embodiment shows only two applications, but it should be appreciated that there may be any number of applications on utilization monitoring system 100. In some embodiments, one application of interest, such as application 130A, may be monitored by resource monitor 110. In said embodiments, utilization calculator 120 receives utilization metrics 115 corresponding to application 130A and computes a utilization corresponding to application 130A alone. In another embodiment, multiple applications, such as applications 130A and 130B, may be monitored by resource monitor 110. In said embodiments, utilization calculator 120 receives utilization metrics 115 corresponding to applications 130A and 130B and computes a utilization corresponding to applications 130A and 130B considered as one unit.

Figure 2:
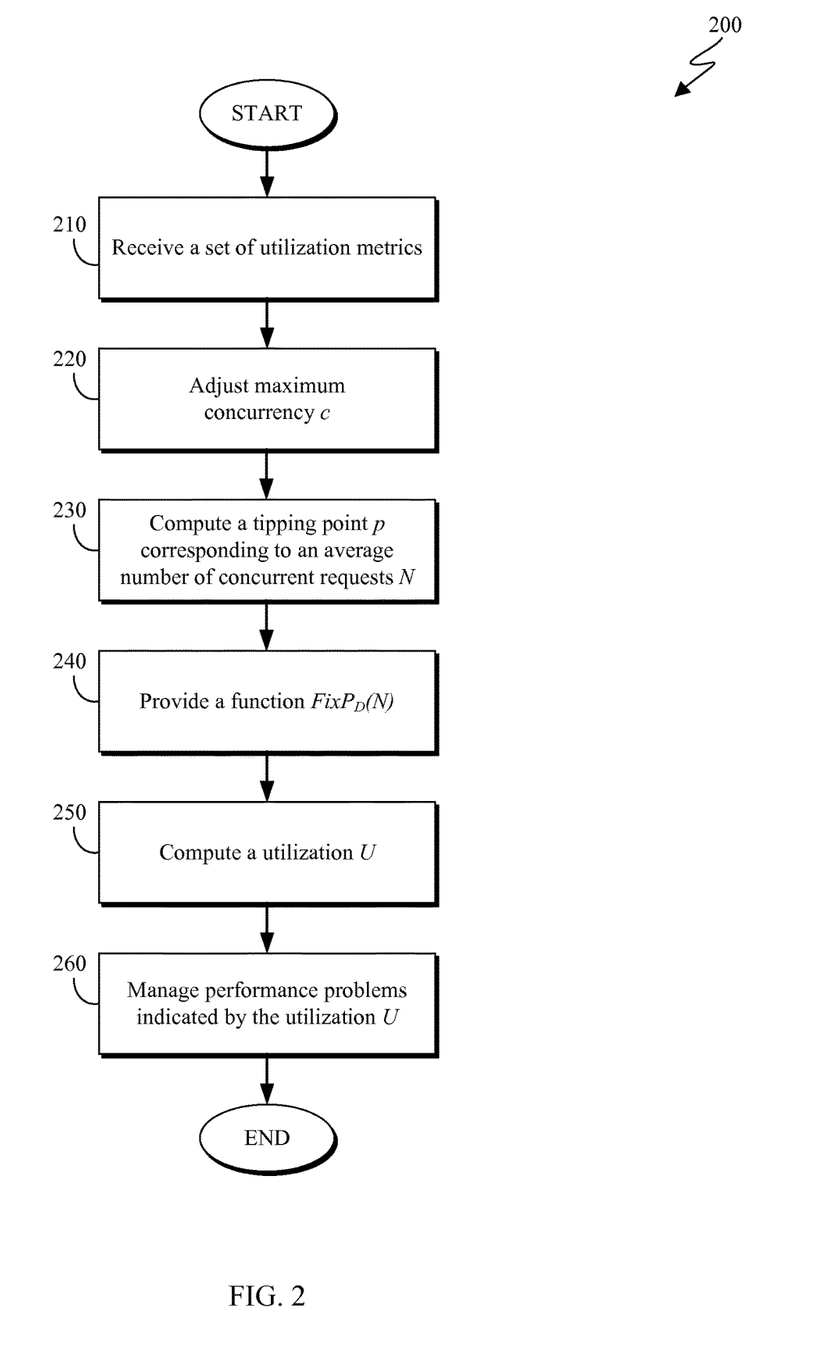
FIG. 2 is a flowchart depicting one embodiment of a utilization calculation method in accordance with some embodiments of the present invention.

FIG. 2 is a flowchart depicting a utilization calculation method 200 in accordance with some embodiments of the present invention. As depicted, utilization calculation method 200 includes receiving (210) a set of utilization metrics, computing (230) a tipping point p corresponding to an average number of concurrent requests, providing (240) a function $FixP_D(N)$, computing (250) a utilization U, and managing (260) performance problems indicated by the utilization U. Utilization calculation method 200 may enable a utilization to be computed accurately within two decimal places.

Receiving (210) a set of utilization metrics may include receiving statistics relevant to the utilization of a system. In some embodiments, the set of utilization metrics includes a maximum concurrency c that a computing system is capable of supporting. The set of utilization metrics may also include an observed average number of concurrent requests N on the system. In some embodiments, the set of utilization metrics includes an average measured response time of the system R as well as a response time s for requests issued when the current number of outstanding requests was less than the estimated concurrency by at least one request. In one embodiment, the received set of utilization metrics may correspond to one or more applications of interest within a system.

Adjusting (220) maximum concurrency c may include executing a maximum concurrency adjustment method. In one embodiment, the executed maximum concurrency adjustment method corresponds to maximum concurrency adjustment method 300 as described with respect to FIG. 3. Adjusting (220) maximum concurrency c may provide a more accurate maximum concurrency c, and may therefore enable a more accurate utilization calculation.

Computing (230) a tipping point corresponding to an average number of concurrent requests may include processing the received set of utilization metrics to provide a tipping point p. In some embodiments, computing (230) a tipping point may include executing a tipping point calculation method such as tipping point calculation method 400 discussed with respect to FIG. 4.

Providing (240) a function $FixP_D(N)$ may include providing a function of the maximum concurrency c, the tipping point p, and the average number of concurrent requests N. $FixP_D(N)$ is an approximation for the denominator of equation (1). The denominator of equation 1 exhibits a behavior in which there are two ranges. Each range responds to changes in N differently, but the pattern of response can be described within a given range. For this reason, the function $FixP_D(N)$ may be a piecewise function or a non-piecewise function. In one embodiment, the function $FixP_D(N)$ is a function that incorporates two curve segments that form a smooth joint at the point at which they meet. In some embodiments, the function $FixP_D(N)$ may also be a function that has an overall smooth shape. For example, the function $FixP_D(N)$ may be defined as:

$$FixP_D(N) = c + f(f(N/p)) \text{ if } N < p$$

$$FixP_D(N) = N + 1 + b \cdot f(p/N) \text{ if } N \geq p \quad (3)$$

where $$f(y) = y - b \cdot y \cdot (1-y) + 0.5 \cdot b \cdot (b-1) \cdot y \cdot (1-y)^2$$

With respect to equation 3, the variable b is defined as $b = c - p$. Equation 3 meets all of the criteria as previously defined; that is, it is a piecewise function that incorporates two curve segments that form a smooth joint at the point at which they meet. The function also has a shape that could be classified as smooth.

Computing (250) a utilization U may include processing the function $FixP_D(N)$ corresponding to the received maximum concurrency c, the average number of concurrent requests N, and the computed tipping point p. The utilization U may then be computed with respect to the function $FixP_D(N)$ and the average number of concurrent requests N. In one embodiment, the utilization U is computed according to the equation:

$$U = N / FixP_D(N) \quad (4)$$

Computing the utilization U via equation 4 may provide a utilization that is accurate with a precision of two digits. One additional advantage of using equation (3) and equation (4) to compute the utilization is that the calculations required by equation (3) and equation (4) do not require the use of transcendental mathematical operations. Therefore, processing environments that support only four operation arithmetic are capable of executing this calculation method.

Managing (260) performance problems indicated by the utilization U may include analyzing the utilization U to determine if the system or individual components of the system are being over-utilized. In one embodiment, managing (260) performance problems indicated by the utilization includes identifying components of the system that exhibit a high utilization and adjusting the system to balance the utilization across available components. Additionally, adjusting the system could include introducing additional components to the system to help balance the workload more efficiently.

Figure 3:
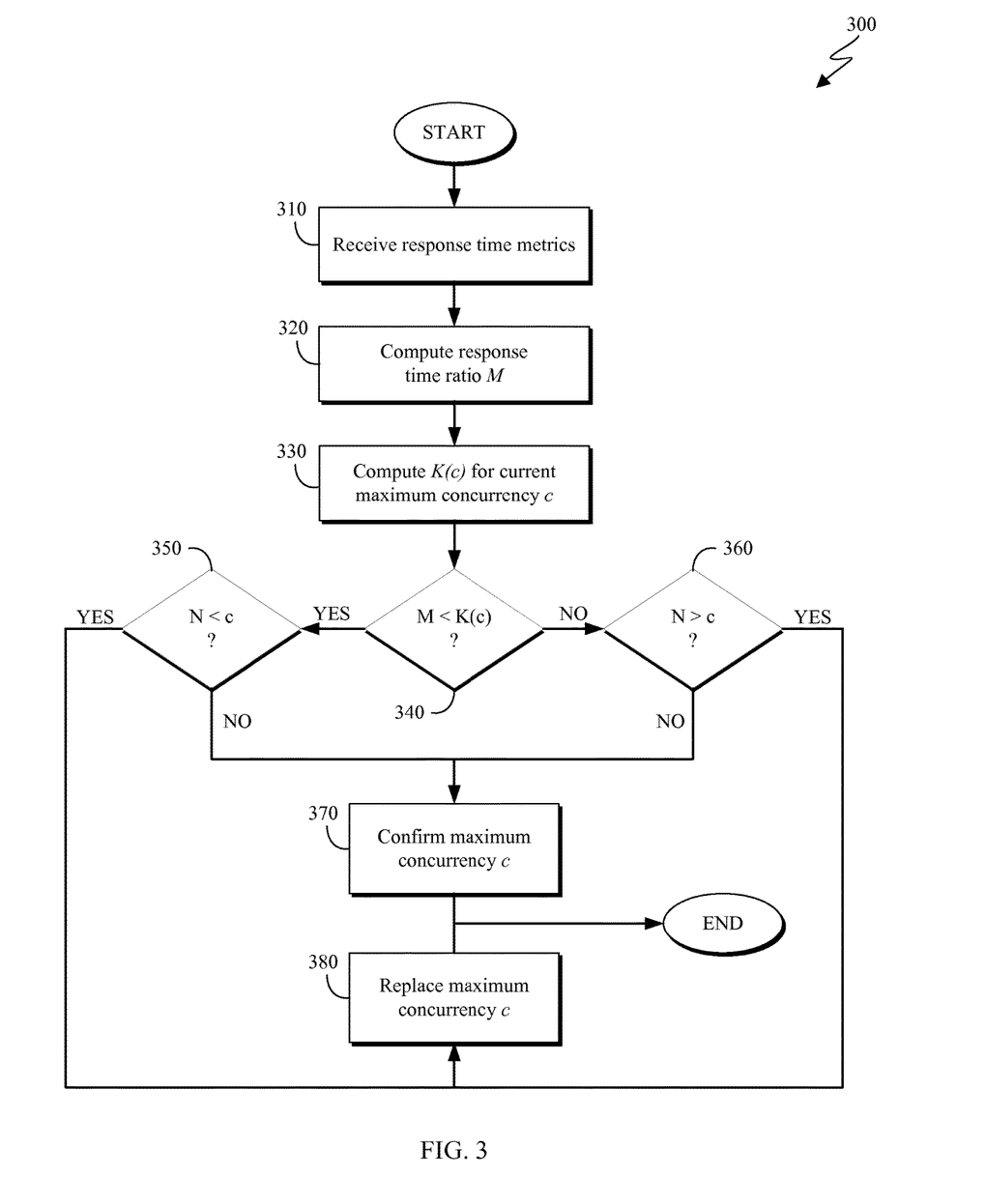
FIG. 3 is a flowchart depicting a maximum concurrency adjustment method in accordance with some embodiments of the present invention.

FIG. 3 is a flowchart depicting a maximum concurrency adjustment method 300 in accordance with some embodiments of the present invention. As depicted, the maximum concurrency adjustment method 300 includes receiving (310) response time metrics, computing (320) a current response ratio, computing (330) a maximum concurrency response ratio K(c) for when the number of active requests is equal to maximum concurrency c, determining (340) if M is less than K(c), determining (350) if the average number of requests N is less than maximum concurrency c, determining (360) if N is greater than maximum concurrency c, confirming (370) maximum concurrency c, and replacing (380) maximum concurrency c. Maximum concurrency adjustment method 300 may enable the maximum concurrency of a system to be monitored and dynamically adjusted.

Receiving (310) response time metrics may include receiving statistics corresponding to the time it takes a system to respond to a request. In some embodiments, receiving (310) response time metrics includes receiving an average measured response time R. Receiving (310) response time metrics may also include receiving a minimum interference response time s corresponding to requests issued when the current number of outstanding requests was at least one request below the estimated concurrency.

Computing (320) a current response ratio may include determining a ratio of the minimum interference response time to the average measured response time. In some embodiments, the response ratio M is computed according to the equation:

$$M = s/R \qquad (5)$$

Response ratio M corresponds only to a time period for which the measured values s and R are applicable.

Computing (330) a maximum concurrency response ratio K(c) for when the number of active requests is equal to maximum concurrency c may include providing a function K(c) for estimating a response ratio for different values of c. In one embodiment, the function may be:

$$K(c) = c/(c+1+0.6875*b+0.3125*b/c+0.5*b^2/c^2) \qquad (6)$$

With respect to equation 4, the variable b is defined as b=c−p. Equation 6 may be utilized to compute a response ratio for any number of values of maximum concurrency c.

Determining (340) if M is less than K(c) may include comparing the current response ratio M to the maximum concurrency response ratio K(c). If it is determined that current response ratio M is less than maximum concurrency response ratio K(c) (340, yes branch), the method continues by determining (350) if the average number of requests N is less than maximum concurrency c. If it is determined that current response ratio M is not less than maximum concurrency response ratio K(c) (340, no branch), the method continues by determining if the average number of requests N is greater than the maximum concurrency c.

Determining (350) if the average number of requests N is less than maximum concurrency c may include comparing the average number of requests N to the current maximum concurrency c. If it is determined that the average number of requests N is less than maximum concurrency c (350, yes branch), the method continues by replacing (380) maximum concurrency c. If it is determined that the average number of requests N is not less than maximum concurrency c (350, no branch), the method continues by confirming (370) maximum concurrency c.

Determining (360) if the average number of requests N is greater than maximum concurrency c may include comparing the average number of requests N to the current maximum concurrency c. If it is determined that the average number of requests N is greater than the maximum concurrency c (360, yes branch), the method continues by replacing (380) maximum concurrency c. If it is determined, that the average number of requests N is less than the maximum concurrency c (360, no branch), the method continues by confirming (370) maximum concurrency c.

Confirming (370) maximum concurrency c may include leaving the current value of maximum concurrency c unaltered. If the method reaches this step, it has been determined that there is no reason to believe that c is an inaccurate measurement of the maximum concurrency, and therefore adjustments need not be made. In some embodiments, confirming (370) the maximum concurrency of the system is c includes terminating the method without making any adjustments to the maximum concurrency c.

Replacing (380) maximum concurrency c may include redefining the value c. If the method reaches this step, it has been determined that there is reason to believe that the value c may be an inaccurate measurement of the maximum concurrency, and therefore adjustments should be made. In one embodiment, replacing maximum concurrency c comprises redefining c to be equivalent to the current average number of requests N. This procedure is performed because at this step, there is reason to believe that the value of N lies between the inaccurate concurrency measurement c and the true maximum concurrency of the system.

Figure 4:
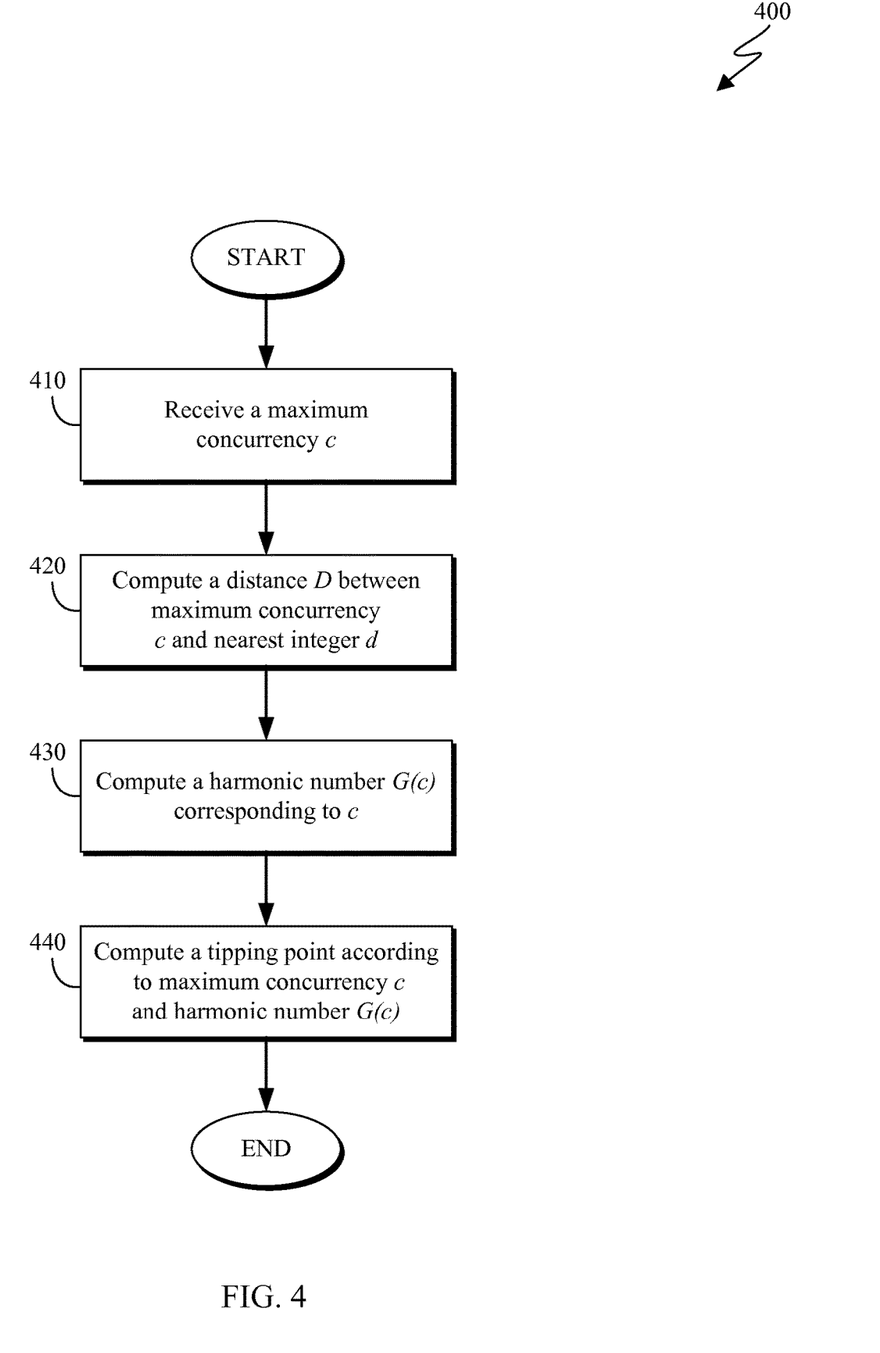
FIG. 4 is a flowchart depicting one embodiment of a tipping point calculation method in accordance with some embodiments of the present invention.

FIG. 4 is a flowchart depicting a tipping point calculation method 400 in accordance with some embodiments of the present invention. As depicted, tipping point calculation method 400 includes receiving (410) maximum concurrency c, computing (420) a distance D between maximum concurrency c and a nearest integer d, computing (430) a harmonic number corresponding to maximum concurrency c, and computing (440) a tipping point according to maximum concurrency c.

Receiving (410) maximum concurrency c may include receiving a metric indicating a maximum number of concurrent requests a system is capable of supporting. In one embodiment, the maximum concurrency c corresponds to an entire computer system. In other embodiments, the maximum concurrency c corresponds to one or more applications of interest.

Computing (420) a distance between maximum concurrency c and a nearest integer d may include identifying an integer d that is closest to maximum concurrency c. Once d is identified, an absolute distance D between c and d is computed according to the equation D=|c−d|. Distance D may be utilized to compute a harmonic number corresponding to maximum concurrency c.

Computing (430) a harmonic number corresponding to maximum concurrency c may include utilizing a provided equation to compute an extended harmonic number G(c). In one embodiment, G(c) is computed according to the equation:

$$G(c) = 2*D*\{H_{[c+1]} - 1/(2[c]+2.52)\} + (1-2*D)*H_d \qquad (7)$$

With respect to equation 7, the notation [c] corresponds to the greatest integer function of c. That is, for non-negative numbers, [c] is the integer part of c. Additionally, the notation $H_d$ corresponds to the $d^{th}$ harmonic number in the set of harmonic numbers.

Computing (440) a tipping point may include processing extended harmonic number G(c) and maximum concurrency c to provide a tipping point p. In one embodiment, the tipping point p is computed according to the equation:

$$p = c - G(c+2) + G(3) + 1.6/(c+7) - 9.6/(c+47) \qquad (8)$$

When equation 8 is utilized to compute the tipping point p, equation 7 must first be utilized to compute G(c+2). The tipping point p may be utilized in a utilization calculation method such as utilization calculation method 200 as an input variable for computing a utilization.

While equation (3) and equation (4) may enable utilization calculation for processors that support only four operation arithmetic, the utilization may be computed directly by repeated application of equation (2) in processing environments that enable transcendental mathematical operations. In such environments, the utilization may also be calculated as follows:

$$U_{i+1}=U_i-(c*U_i+N*U_i^c-N)*c/(c^2+N^2) \text{ for } N \leq p$$

$$U_{i+1}=[U_i^c-(c*U_i+N*U_i^c-N)*N/(c^2+N^2)]^{1/c} \text{ for } N > p$$

where $$U_0=N/(c+v^{(c+1)/2}) \text{ for } N \leq p$$

$$U_0=N/(N+1+b*v^{v((c+1)/2)}) \text{ for } N > p \qquad (9)$$

With respect to equation (9), i=0, 1, 2 ... etc., v=min(N, p)/max(N, p), and the other variables are as previously defined. U can be estimated to be any member of the sequence formed by equation 9.

Figure 5:
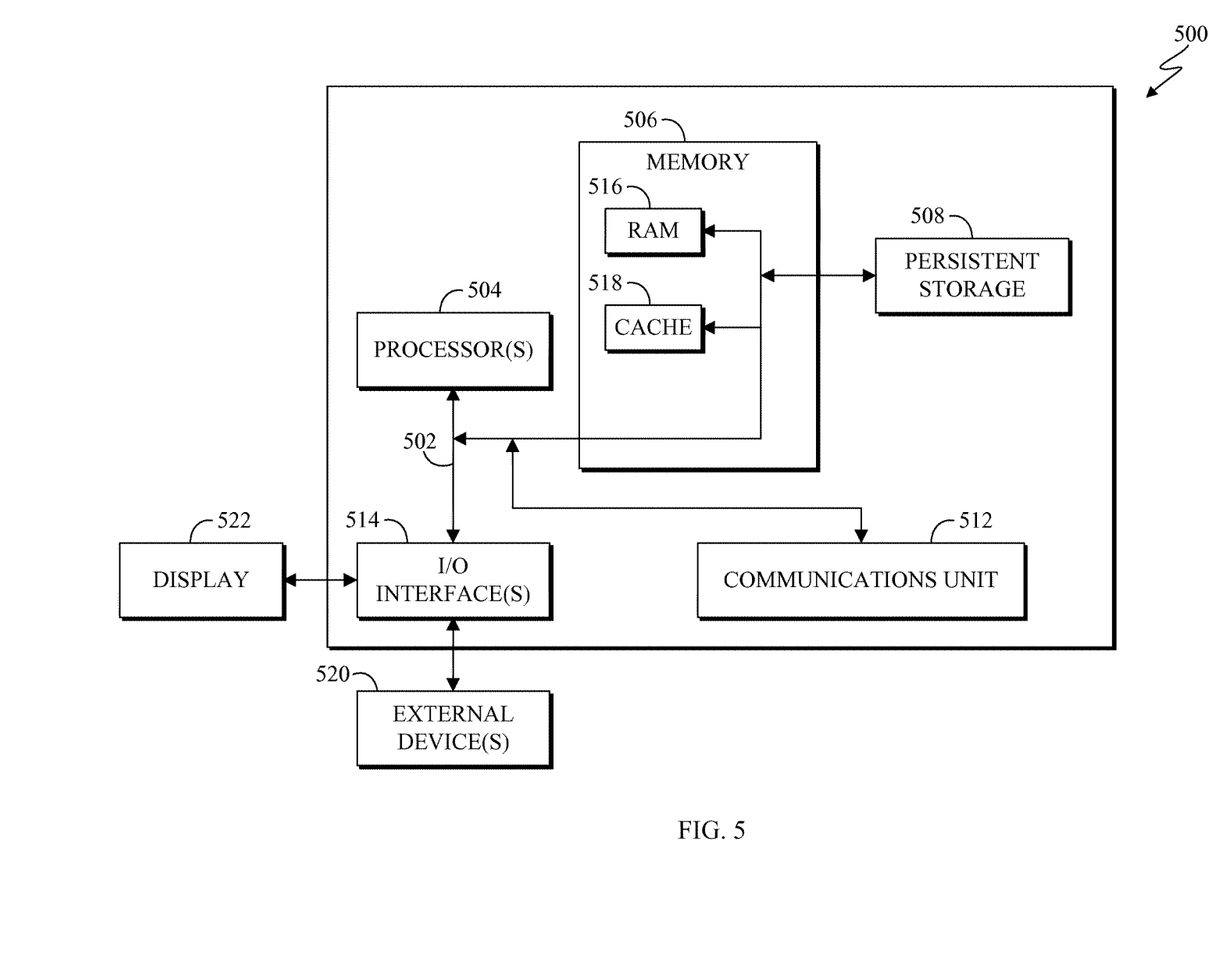
FIG. 5 depicts a block diagram of components of a computer, in accordance with some embodiments of the present invention.

FIG. 5 depicts a block diagram of components of computer 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (110) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

One or more programs may be stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method, comprising:
receiving, by one or more processors, a set of utilization metrics for a system comprising at least an average number of concurrent requests N to the system and a maximum concurrency c that the system is capable of supporting;
computing, by one or more processors, a tipping point p corresponding to the average number of concurrent requests N;
computing, by one or more processors, a utilization U according to a ratio of the average number of concurrent requests N to a function $FixP_D(N)$, where $FixP_D(N)$ is defined as:

$FixP_D(N)=c+f(f(N/p))$ for $N<p$, and $FixP_D(N)=N+1+b*f(p/N)$ for $N \geq p$, where $b=c-p$ and $f(y)=y-b*y*(1-y)+0.5*b*(b-1)*y*(1-y)^2$; and adjusting, by one or more processors, the system, utilizing the utilization U.

2. The method of claim 1, further comprising computing, by one or more processors, an extended harmonic number G(c) according to an equation $G(c)=2*D\{H_{[c+1]}-1/(2*[c]+2.52)\}+(1-2*D)*H_d$, wherein D is a distance between c and a nearest integer d, $H_d$ is a $d^{th}$ harmonic number, and [c] denotes a greatest integer function of c.

3. The method of claim 2, wherein the tipping point p is computed according to an equation $p=c-G(c+2)+G(3)+1.6/(c+7)-9.6/(c+47)$.

4. The method of claim 1, wherein adjusting the system, utilizing the utilization U, comprises:
- identifying, by one or more processors, components of the system that exhibit a predetermined utilization; and
- adjusting, by one or more processors, the system to balance the utilization U across available components.

5. A computer program product for computing a system utilization, the computer program product comprising:
- one or more computer readable storage media and program instructions stored on the one or more computer readable storage media, the program instructions, executable by a computer, comprising instructions to:
  - receive, by one or more processors, a set of utilization metrics for a system comprising at least an average number of concurrent requests N to the system and a maximum concurrency c that the system is capable of supporting;
  - compute, by one or more processors, a tipping point p corresponding to the average number of concurrent requests N;
  - compute, by one or more processors, a utilization U according to a ratio of the average number of concurrent requests N to a function $\text{FixP}_D(N)$, where $\text{FixP}_D(N)$ is defined as:

$\text{FixP}_D(N) = c + f(f(N/p))$ for $N < p$, and $\text{FixP}_D(N) = N + 1 + b \cdot f(p/N)$ for $N \geq p$, where $b = c - p$ and $f(y) = y - b \cdot y \cdot (1-y) + 0.5 \cdot b \cdot (b-1) \cdot y \cdot (1-y)^2$;
  and
  - adjust, by one or more processors, the system, utilizing the utilization U.

6. The computer program product of claim 5, further comprising program instructions to compute an extended harmonic number G(c) according to an equation $G(c) = 2 \cdot D \{H_{[c+1]} - \frac{1}{2} \cdot [c] + 2.52)\} + (1 - 2 \cdot D) \cdot H_d$, wherein D is a distance between c and a nearest integer d, $H_d$ is a $d^{th}$ harmonic number, and [c] denotes a greatest integer function of c.

7. The computer program product of claim 6, wherein the tipping point p is computed according to an equation $p = c - G(c+2) + G(3) + 1.6/(c+7) - 9.6/(c+47)$.

8. The computer program product of claim 5, wherein program instructions to adjust the system, utilizing the utilization U, comprise instructions to:
- identify, by one or more processors, components of the system that exhibit a predetermined utilization; and
- adjust, by one or more processors, the system to balance the utilization U across available components.

9. A system, comprising one or more processors for:
- receiving, by the one or more processors, a set of utilization metrics for the system comprising at least an average number of concurrent requests N to the system and a maximum concurrency c that the system is capable of supporting;
- computing, by the one or more processors, a tipping point p corresponding to the average number of concurrent requests N;
- computing, by the one or more processors, a utilization U according to a ratio of the average number of concurrent requests N to a function $\text{FixP}_D(N)$, where $\text{FixP}_D(N)$ is defined as:

$\text{FixP}_D(N) = c + f(f(N/p))$ for $N < p$, and $\text{FixP}_D(N) = N + 1 + b \cdot f(p/N)$ for $N \geq p$, where $b = c - p$ and $f(y) = y - b \cdot y \cdot (1-y) + 0.5 \cdot b \cdot (b-1) \cdot y \cdot (1-y)^2$;
  and
- adjusting, by the one or more processors, the system, utilizing the utilization U.

\* \* \* \* \*